United States Patent [19]
Gharavi

[11] Patent Number: 5,276,525
[45] Date of Patent: Jan. 4, 1994

[54] TWO-DIMENSIONAL BLOCK SCANNING FOR SUBBAND IMAGE AND VIDEO CODING

[75] Inventor: Hamid Gharavi, Red Bank, N.J.

[73] Assignee: Bell Communications Research, Inc., Livingston, N.J.

[21] Appl. No.: 673,957

[22] Filed: Mar. 22, 1991

[51] Int. Cl.$^5$ .............................................. H04N 1/41
[52] U.S. Cl. ............................ 358/261.1; 358/261.3; 358/133; 358/136; 358/138; 358/426; 358/432
[58] Field of Search ................... 358/261.1, 261.3, 133, 358/136, 138, 426, 432

[56] References Cited

U.S. PATENT DOCUMENTS

| | | | |
|---|---|---|---|
| 4,821,119 | 4/1989 | Gharavi | 358/122 |
| 4,827,336 | 5/1989 | Acampora et al. | 358/135 |
| 4,829,378 | 5/1989 | LeGall | 358/133 |
| 4,918,524 | 4/1990 | Ansari et al. | 358/133 |
| 4,969,040 | 11/1990 | Gharavi | 358/136 |
| 5,048,111 | 9/1991 | Jones et al. | 358/133 |
| 5,049,992 | 9/1941 | Citta et al. | 358/140 |
| 5,073,821 | 12/1991 | Juri | 358/133 |
| 5,097,331 | 3/1992 | Chen et al. | 358/133 |
| 5,107,348 | 4/1992 | Citta et al. | 358/133 |
| 5,113,256 | 5/1992 | Citta et al. | 358/133 |

OTHER PUBLICATIONS

"Optimum Run Length Codes", H. Meyr et al.1, *IEEE Transactions on Communications*, vol. Com-22, No. 6, Jun. 1974, pp. 826-835.

"Sub-band Coding of Digital Images Using Two-Dimensional Quadrature Mirror Filtering", H. Gharavi et al., *Proceedings of SPIE-Visual Communications and Image Processing*, Sep. 15-16, 1986, Cambridge, MA, pp. 51-61.

"Subband Coding of Images", John W. Woods, et al., *IEEE Transactions on Acoustics, Speech, and Signal Processing*, vol. ASSP-34, No. 5, Oct. 1986, pp. 1278-1288.

*Primary Examiner*—Edward L. Coles, Sr.
*Assistant Examiner*—Thomas L. Stoll
*Attorney, Agent, or Firm*—Leonard Charles Suchyta; Stephen M. Gurey

[57] ABSTRACT

A signal coder is disclosed with improved compression of pictorial data that has been decomposed into plural subbands through a two-dimensional quadrature-mirror decomposition (102). In each of the higher frequency bands, the decomposed samples are quantized and then partitioned (106, 110, 114), in two dimensions, into blocks. The blocks in each band are scanned (107, 111, 115) in a way that exploits the characteristics of the band so as to increase the average length of the runs of zero and nonzero quantized samples. The bands containing horizontal, vertical and diagonal edge information are scanned with a horizontal, vertical, and diagonal zig-zag pattern, respectively. These scanned bands are entropy coded (108, 112, 116) using run-length coding to code the runs of either zero band or nonzero quantized samples.

6 Claims, 3 Drawing Sheets

TWO-DIMENSIONAL BLOCK SCANNING FOR SUBBAND IMAGE AND VIDEO CODING

BACKGROUND OF THE INVENTION

This invention relates to the compression of pictorial data such as video and still image data, and more specifically to the compression coding of the higher frequency subbands in a system which decomposes, in two dimensions, a still image or video signal.

The principle of subband coding is based on the decomposition of an input still image/video frame, into a subpicture/subframe, where each represents a region in the two-dimensional frequency spectrum of the image/video frame. The main property of subband decomposition is the ability to reshape the noise in the frequency spectrum by taking into consideration human visual perception. The lowest frequency band contains the general brightness areas of the picture whereas the edge information falls within the higher frequency bands. It is, however, a characteristic of the eye (spatial masking) that it is unable to perceive errors in the vicinity of large changes in the brightness. To exploit this important visual property and achieve greater compression, it is desirable to encode the high frequency bands with lower accuracy. In other words, coding efficiency depends heavily on how these higher frequency bands are coded. As far as the lowest band is concerned, since this band (in terms of the number of samples relative to the original) is a "miniature" version of the original image/video frame, there is little that can be done except to employ some conventional coding methods such as differential pulse code modulation (DPCM), transform coding, or hybrid coding, etc.

Two-dimensional quadrature mirror filtering (QMF) of image and video signals has been studied extensively in the prior art. The application of QMF to image coding has been considered by J. W. Woods and S. O'Neal in "Sub-band Coding of Images," *Proc. ICASP* 86, April 1986, pp. 1005–1008 and in a similarly titled article by the same authors in *IEEE Trans. ASSP*, Vol. 34, October 1986, pp. 1278–1288. It has also been investigated by the inventor herein and A. Tabatabai in several articles such as "Sub-band Coding of Digital Images Using Two-Dimensional Quadrature Mirror Filtering," *Proc. SPIE*, Vol 707, September 1986, pp. 51–61; in "Applications of Quadrature Mirror Filtering to the Coding of Monochrome and Color Images," *proc. ICASP* 87, Vol. 4, pp. 2384–2387; and in "Subband Coding of Monochrome and Color Images," *IEEE Trans. on Circuits and Systems*, Vol. 35, February 1988, pp. 207–214. In the Woods and O'Neal approach, individual bands are coded using adaptive DPCM, whereas in the approach described by the inventor herein and A. Tabatabai, except for the lowest frequency band, all other bands are coded using a combination of PCM quantization and run-length coding for the transmission of the location of nonzero PCM values. Subband coding of video signals has also been considered in the inventor herein in U.S. Pat. No. 4,969,010 issued Nov. 6, 1990. As described in that patent, differential pel values are decomposed using separable two-dimensional quadrature mirror filtering. Each subband is quantized separately and coded by entropy coders, which code the quantized values by variable word-length coding the nonzero quantized values and transmitting that information with the corresponding run-length coded positional information.

In the prior art schemes described in the aforenoted articles relating to image compression by the inventor herein and A. Tabatabai, and in the aforenoted patent relating to compression of a video signal, each of the high frequency decomposed bands are quantized using individual uniform quantizers having a center dead-zone and a step-size that may be tailored to the characteristics of the particular band. The function of the quantizer dead-zone is to eliminate the low level noise which would consequently reduce the number of non-zero values. As a result, the higher band images and video signals contain only a limited number of nonzero pels, which correspond to the contour points in the still image or video frame. In order to achieve better compression, only the nonzero quantized values with their corresponding positional information need be transmitted. In particular, and as noted above, the positional information is run-length coded by considering each scan line as a sequence of black and white runs, wherein the black run corresponds to zeros and the white run to nonzero values. In these prior art schemes, a significant number of overall bits go toward the run-length coded positional information.

An object of the present invention is to improve the coding performance by increasing the efficiency in which the positional information is coded for the higher frequency bands of a two-dimensional QMF decomposed pictorial data derived from a still image or video signal.

An additional object of the present invention is to exploit the two-dimensional spatial dependencies in an image or video frame in the coding of the positional information.

A further object of the present invention is to devise a two-dimensional run-length coding strategy which provides a signal with long bit runs.

SUMMARY OF THE INVENTION

It has been found that by employing the more efficient coding scheme of the present invention to encode the higher frequency subband signals of two-dimensional decomposed pictorial data, such as an image or a video signal, an approximate 20% bit rate reduction can be achieved. In accordance with the present invention, the decomposed samples in the higher frequency subbands of input pictorial data are quantized and partitioned in two-dimensions into nonoverlapping blocks of quantized samples. Scanning, rather than being performed horizontally across the line, is performed on a block-by-block basis starting from the first block on the upper most left and continuing in the horizontal direction until the last block (upper most right) is scanned. The resulting bit stream is then run-length coded and transmitted together with nonzero PCM coded values. The process continues in the same manner until the last strip of blocks in each two-dimensional subband is scanned and coded. More specifically, depending upon the nature of the subband with respect to its position in the two-dimensional frequency spectrum, the blocks of the subband are scanned in a predetermined manner so as to increase the average black and white runs, and thereby improve the run-length coding efficiency.

DETAILED DESCRIPTION

Figure 1:
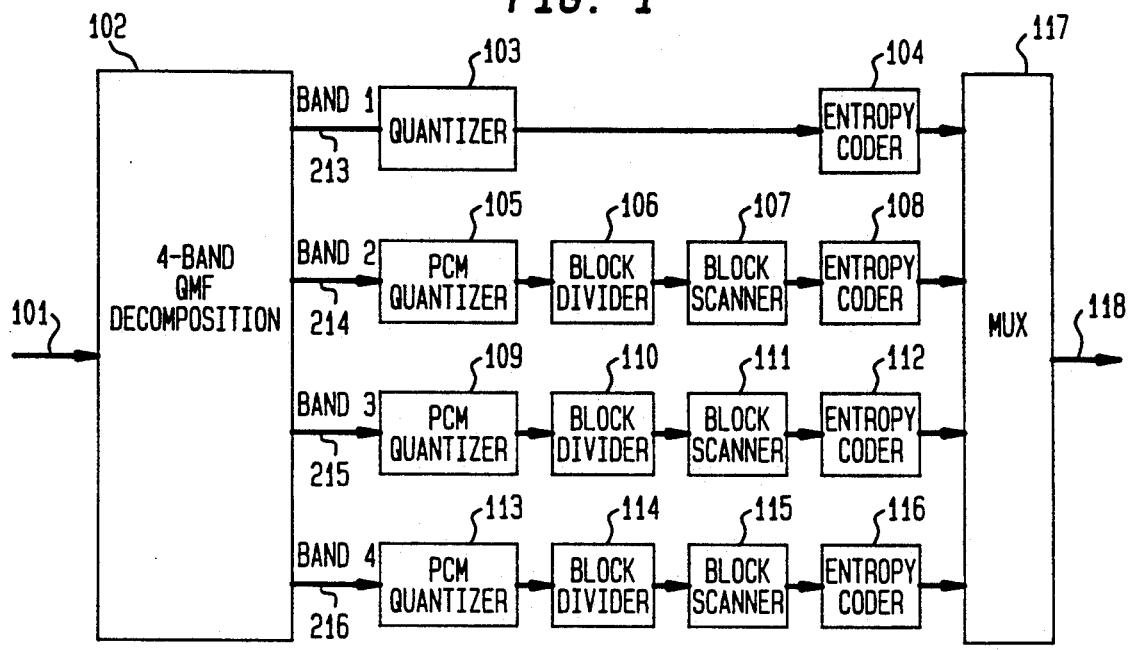
FIG. 1 is a block diagram of the coding system of the present invention as applied to four-band QMF decomposed pictorial data.
Figure 2:
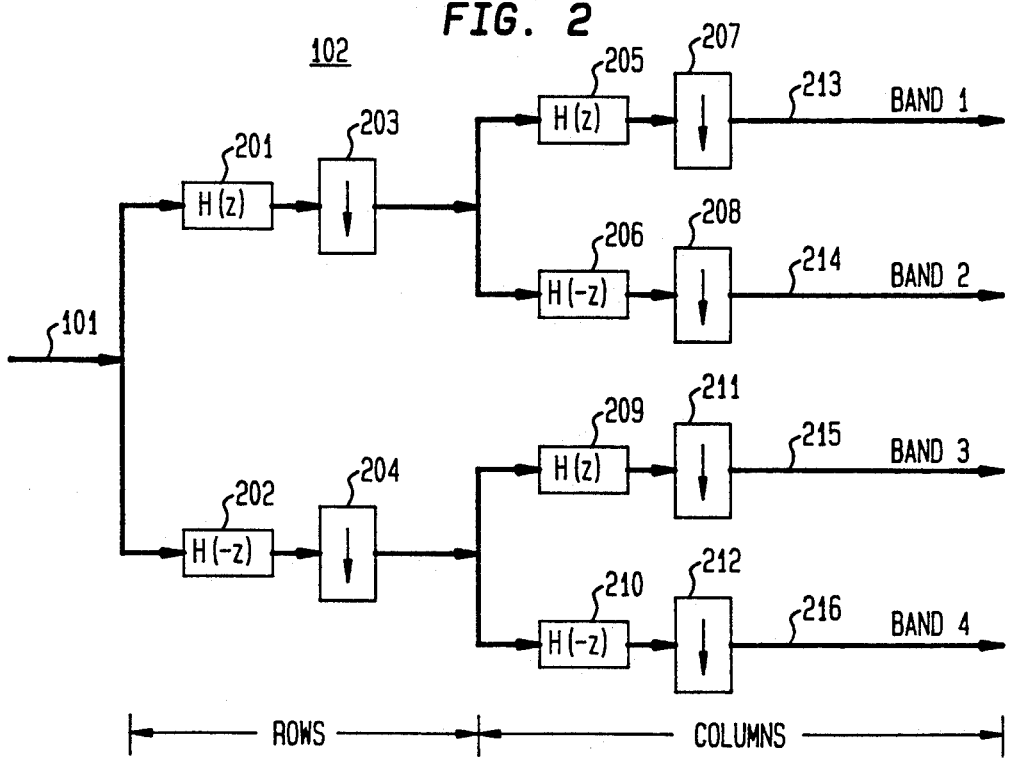
FIG. 2 is a block diagram of the four-band QMF signal decomposer used in FIG. 1.

With reference to FIG. 1, pictorial data such as image data, the pels of a video frame, or frame-to-frame differential pel elements are input on lead 101 to a four-band quadrature-mirror filter decomposer 102. Decomposer 102 performs a standard, well known in the art, two-dimensional decomposition of the applied input pictorial data into four frequency subbands. FIG. 2 shows a block diagram of such a four-band QMF decomposer. In this decomposer the input pictorial data on lead 101 is filtered in the horizontal direction along the rows into low and high frequency subbands by low-pass and high-pass digital filters 201 and 201, respectively, having filter characteristics of $H(z)$ and $H(-z)$. These filtered low and high band samples are decimated by down-converters 203 and 204, respectively, to eliminate alternate filtered samples. These down-converted low and high band filtered samples are then filtered into low and high bands in the vertical direction along the columns. The low band filtered and down-converted samples are filtered into low and high bands in the vertical direction by low pass and high pass filters 205 and 206 having the same filter characteristics of $H(z)$ and $H(-z)$, respectively. These filtered low-low and low-high signals are then decimated by down-converters 207 and 208, respectively. Similarly, the high band filtered and decimated samples at the output of down-converter 204 are filtered and decimated into high-low and high-high bands by the combination of low and high pass filters 209 and 210, respectively, and down-converters 211 and 212. The outputs of down-converters 207, 208, 211 and 212 on leads 213–216, respectively, represent the four decomposed subband signals for band 1, band 2, band 3 and band 4.

Figure 3:
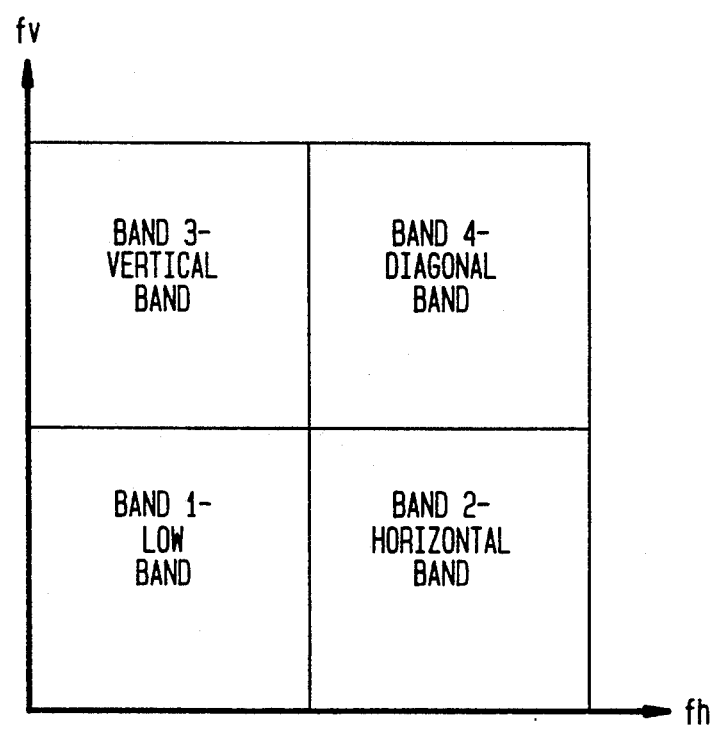
FIG. 3 shows the two-dimensional bandwidth splitting of the input spectrum into a low band, a horizontal band, a vertical band, and a diagonal band.

FIG. 3 shows the position of these individual subbands in the two-dimensional frequency spectrum. Each of these subbands contains one-forth the number of samples per image or video frame as the total number of pictorial data elements at the input to the decomposer on input 101. As aforenoted, band 1, the low band, represents the general brightness of the image and is a "miniature" version of the input image, or video frame. Band 2 is a horizontal band mostly containing vertical edge information, Band 3 is a vertical band mostly containing horizontal edge information, and Band 4 is a diagonal band mostly containing diagonal edge information. As will be described in detail hereinafter, the three higher frequency bands are separately quantized, subdivided into blocks, and scanned in a pattern determined by the particular band and in such a manner so as to increase the average black and white runs.

With reference back to FIG. 1, the Band 1 output of decomposer 102 on lead 213 is input to a quantizer 103, and the quantized values are then coded by entropy coder 104. As noted, Band 1 is the low band, which sample values represent a "miniature" of the original image. As such, and also as previously noted, there is little that can be done to improve the coding efficiency in this band other than apply an efficient coding scheme. Accordingly, conventional coding methods are employed. For example if the input to the decomposer is a still image, differential pulse code modulation (DPCM) coding or discrete cosine transform (DCT) coding can be applied. If the input to the decomposer is a video signal, hybrid coding can be used to encode the frame-to-frame variations. If the input to the decomposer consists of differential pel elements of a video signal, such as in the aforenoted patent to the inventor herein, PCM coding can be applied. On the other hand, and in accordance with the present invention, however, the higher frequency bands are coded in such a way to maximize the black and white runs. By maximizing the lengths of such runs, the number of bits required to code the samples of each of the higher frequency subbands can be substantially reduced.

The Band 2 output of decomposer 102 on lead 214 is input to a PCM quantizer 105. Quantizer 105 has a preset dead zone d which forces many low level sample values to zero. Accordingly, a significant number of the quantized samples at the output of quantizer 105 have a zero value. If these quantized samples are scanned for coding in a predetermined way that is more likely to group the zero and nonzero quantized samples together in consecutive strings, the quantized sample values can be efficiently transmitted. In particular, what is transmitted are run-length coded words for the black (zeros) and white (nonzero) runs, with the actual PCM coded values for the nonzero words being transmitted following each white run-length word. It can be seen, therefore, that the longer the runs, the fewer the number of run-length words required, and thus the fewer total number of bits that need to be transmitted. In accordance with the present invention, each of the higher frequency bands are scanned in a particular manner, depending on the nature of the band, so as to increase the likelihood that the zero and nonzero quantized samples will occur consecutively.

In Band 2, the quantized samples at the output of PCM quantizer 105 are input to a block divider 106. Block divider 106 partitions the two-dimensional quantized samples of Band 2 at the output of quantizer 105 into nonoverlapping blocks. Block scanner 107 then scans the quantized samples on a block-by-block basis starting from the first block on the upper most left and continuing in the horizontal direction until the last block (upper most right) is scanned. The resulting bit stream at the output of scanner 107 is then coded by entropy coder 108. Coder 108 run-length codes the black and white runs and forms a bit stream combining these runs with the nonzero PCM coded values, in the manner described above. Scanning and coding of the blocks continues in the same manner until the last strip of blocks in the two-dimensional subband is scanned and coded. For a block size of m × n, the above arrangement can be viewed as transforming two-dimensional M × N decomposed subband samples into two-dimensional P × Q decomposed quantized samples, where $$P = M \times n \qquad (1)$$

$$Q = \frac{N}{n} \qquad (2)$$

A particular scanning technique is employed by block scanner 107 to exploit the nature of Band 2. Band 2, as noted in FIG. 3 is a horizontal band and contains mostly the vertical edges of the image/video signal. Thus, to increase the average zero and nonzero runs, vertical scanning is performed on each block in the manner shown in FIG. 4B. Furthermore, to help the continuity of the black and white runs, scanning from one block to the next is performed as shown in that Figure.

Figure 4A:
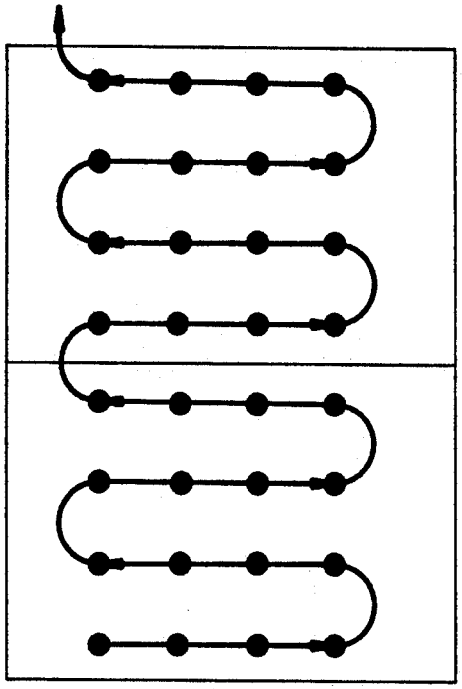
FIG. 4A shows the scanning procedure for a diagonal band.
Figure 4B:
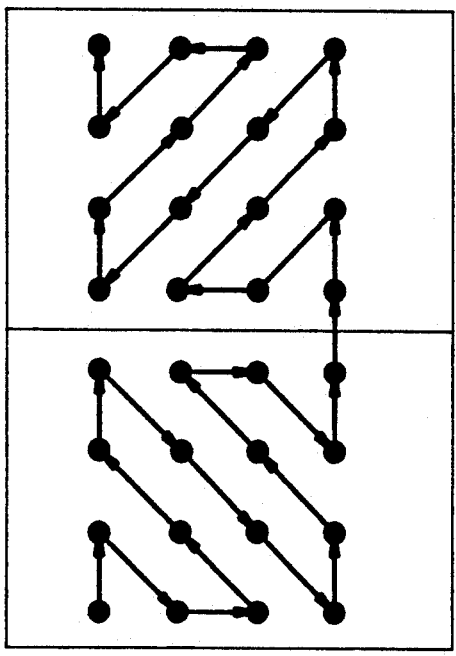
FIG. 4B shows the scanning procedure for a horizontal band.
Figure 4C:
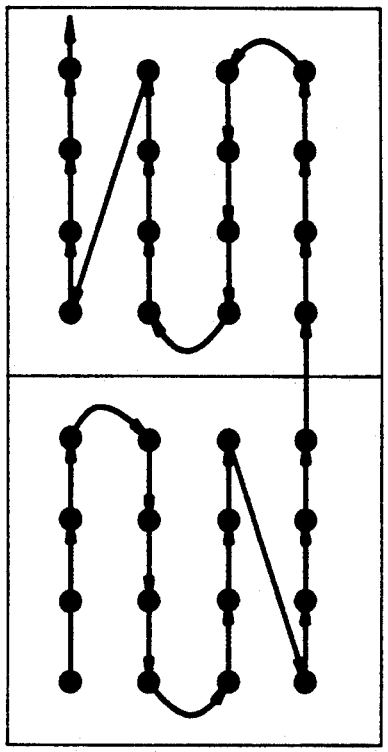
FIG. 4C shows the scanning procedure for a vertical band.

In a similar manner, Band 3 on output lead 215 of decomposer 102 is quantized by quantizer 109, partitioned by block divider 110, scanned by block scanner 111, and coded by entropy coder 112. Band 3 being a vertical band, however, contains horizontal edges. Block scanner 111 thus horizontally scans each block in the manner shown in FIG. 4C. Band 4 on output lead 216 of decomposer 102 is quantized by quantizer 113, partitioned by block divider 114, scanned by block scanner 115, and coded by entropy coder 116. Band 4 is a diagonal band containing diagonal edges. Block scanner 115 therefore uses zig-zag scanning, as shown in FIG. 4A, for this band.

The outputs of entropy coder 104, 108, 112, and 116 are multiplexed together by multiplexor 117 for transmission as a single bit stream on output 118.

With the above described strategy, the length of the maximum run has increased by the factor of n (i.e., $P = nM$). This helps to improve the effectiveness of the end of line (EOL) and end of image/end of frame (EOI/EOL) termination process described below. In cases where the edge activities near the far end of the image/video frame are low, a sequence of quantized zero values are expected. It is therefore beneficial to terminate the run-length process along the line once the last nonzero value is coded. This can also be applied once the last nonzero value is reached in the image or video frame. Termination of the run-length coding process along the line or the last line of the image/frame is achieved by assigning unique codewords to signify the end of line (EOL) or end of image/frame (EOI/EOF).

For each subband, in each modified scan line consisting of $n \times M$ decomposed quantized samples, the sequences of black and white runs are run-length coded, as previously noted. For this run-length coding, a modified version of a B1 code described in "Optimum Run-Length Codes," by H. Meyer, H. G. Rosdolsky, and T. S. Huang in *IEEE Trans. Commun.*, Vol./COM-22, June 1974, pp. 826-835 is employed. This code was selected due to the ease of hardware implementation as the length of codewords increase approximately logarithmically with the run-length. In addition, this code can be used to encode a consecutive black or white sequence regardless of its length. Table I below shows the modified B 1 code used in this embodiment of the present invention.

TABLE I

| RUN | CODE |
| --- | --- |
| 1 | C0 |
| 2 | C1 |
| 3 | C0C0 |
| 4 | C0C1 |
| 5 | C1C0 |
| EOL, EOI/EOF | C1C1 |
| 6 | C0C0C0 |
| 7 | C0C0C1 |
| 8 | C0C1C0 |
| 9 | C0C1C1 |
| 10 | C1C0C0 |
| 11 | C1C0C1 |

TABLE I-continued

| RUN | CODE |
| --- | --- |
| 12 | C1C1C0 |
| 13 | C1C1C1 |
| | ETC. |

The first bit, "C", of each block is the color bit indicating whether the run is black (i.e. a "0" indicates a run of zero elements) or white (i.e. a "1" indicates a run of nonzero elements). Subsequent blocks with the same color bit form a codeword. In the decoding process, the color bit is used to examine whether a new block belongs to the codeword being decoded or is the start of a new codeword.

In the modified B1 code, the codeword C1C1 is the codeword for EOL and EOI/EOF, this codeword having been the word assigned to the run of length six in the unmodified B1 code. The codeword for the run of length six is thus assigned to the codeword assigned to the run of seven in the unmodified B1 code, and so forth. The EOL codeword requires another bit to signify the its uniqueness, this additional bit being opposite to the "C" bit chosen for EOL. Thus EOL is selected to be "01011" and the EOI/EOF codeword is the word with the opposite "C", "11110". Such EOL and EOI/EOF codewords can then be uniquely decoded.

Although described hereinabove in connection with a four-band two-dimensional QMF decomposition of the input pictorial data, other decompositions could be performed such as a well known seven-band nonuniform decomposition. For such a seven-band decomposition, each of the horizontal bands would be vertically scanned, each of the vertical bands would be horizontally scanned, and each of the diagonal bands would be scanned using a zig-zag pattern.

As previously noted the present invention could be applied to the system described in the present inventor's previous patent, noted hereinabove. In that system, the pictorial data that is decomposed into plural subbands consists of differential pel values. The principles of the present invention would be applied to code the higher frequency subbands. Furthermore, the present invention could be used in conjunction with the present inventor's multilayer universal video coder described in co-pending patent application Ser. No. 673,958, filed simultaneously with the present application on Mar. 22, 1991 In that system, a video signal is decomposed in two dimensions into plural subbands. The higher frequency subbands are coded using either an interframe DPCM coder or a direct intraframe PCM coder, depending upon whether the band is a horizontal or vertical band, or is a diagonal band, respectively. For the interframe DPCM coders, the quantizers would be incorporated within the DPCM loops. The resultant two-dimensional differential decomposed samples would be partitioned and scanned either horizontally or vertically, depending on the particular subband. The direct PCM coded decomposed samples from the diagonal bands would be partitioned and scanned using the aforedescribed zig-zag pattern.

The above-described embodiment is illustrative of the principles of the present invention. Other embodiments could be devised by those skilled in the art without departing from the spirit and scope of the present invention.

What is claimed is:

1. In a signal coder for pictorial data that decomposes the pictorial data in two-dimensions into plural subbands of decomposed samples, each subband being classified in accordance with its position in a two-dimensional frequency spectrum as a lower frequency subband containing general brightness information, a horizontal higher frequency subband containing vertical edge information, a vertical higher frequency subband containing horizontal edge information, or a diagonal higher frequency subband containing diagonal edge information, apparatus for coding the higher frequency subbands of decomposed samples comprising:

quantizing means in each higher frequency subband for quantizing the decomposed samples; and coding means in each higher frequency subband for run-length coding the runs of zero-valued quantized decomposed samples and the runs of nonzero-valued quantized decomposed samples;

characterized in that said apparatus further comprises:

partitioning means in each higher frequency subband for partitioning in two-dimensions the quantized decomposed samples into blocks of quantized decomposed samples; and scanning means in each higher frequency subband for scanning the quantized decomposed samples within each block with a same scanning pattern that is associated with that subband's classification as a horizontal, a vertical, or a diagonal subband, the scanning pattern that is associated with each type of subband being different than the scanning pattern associated with each of the other types of subbands and chosen to increase the likelihood of runs of consecutive zero-valued quantized decomposed samples and of runs of consecutive nonzero-valued quantized decomposed samples within the subband, the runs within each scanned subband of consecutive zero-valued and of nonzero-valued quantized decomposed samples being coded by the coding means associated with the subband.

2. Apparatus in a signal coder in accordance with claim 1 wherein each block in a horizontal classified higher frequency subband is scanned with a vertically oriented scanning pattern, each block in a vertical classified higher frequency subband is scanned with a horizontally oriented scanning pattern, and each block in a diagonally classified higher frequency subband is scanned with a zig-zag scanning pattern.

3. In a signal coder for pictorial data that decomposes the pictorial data in two-dimensions into plural subbands of decomposed samples, each subband being classified in accordance with its position in a two-dimensional frequency spectrum as a lower frequency subband containing general brightness information, a horizontal higher frequency subband containing vertical edge information, a vertical higher frequency subband containing horizontal edge information, or a diagonal higher frequency subband containing diagonal edge information, a method of coding the higher frequency subbands of decomposed samples comprising the steps of:

quantizing the decomposed samples in each higher frequency subband;

in each higher frequency subband run-length coding the runs of zero-values quantized decomposed samples and the runs of nonzero-valued quantized decomposed samples;

characterized in that said method further comprises the steps of:

partitioning in two-dimensions in each higher frequency subband the quantized decomposed samples into blocks of quantized decomposed samples; and scanning in each higher frequency subband the quantized decomposed samples within each block with a same scanning pattern that is associated with that subband's classification as a horizontal, a vertical, or a diagonal subband, the scanning pattern that is associated with each type of subband being different than the scanning pattern associated with each of the other types of subbands and chosen to increase the likelihood of runs of consecutive zero-valued quantized decomposed samples and of runs of consecutive nonzero-valued quantized decomposed samples within the subband, the runs within each scanned subband of consecutive zero-valued and of nonzero-valued quantized decomposed samples being run-length coded.

4. The method of claim 3 wherein each block in a horizontal classified higher frequency subband is scanned with a vertically oriented scanning pattern, each block in a vertical classified higher frequency subband is scanned with a horizontally oriented scanning pattern, and each block in a diagonally classified higher frequency subband is scanned with a zig-zag scanning pattern.

5. A signal coder for pictorial data comprising:

means for decomposing the pictorial data in the horizontal and vertical directions into plural subbands of decomposed samples, each subband being classified in accordance with its position in a two-dimensional frequency spectrum as a lower frequency subband containing general brightness information, a horizontal higher frequency subband containing vertical edge information, a vertical higher frequency subband containing horizontal edge information, or a diagonal higher frequency subband containing diagonal edge information, means for quantizing and coding the decomposed samples in the lower frequency subband;

means in each higher frequency subband for quantizing the decomposed samples; and means in each higher frequency subband for run-length coding the runs of zero-valued quantized decomposed samples and the runs of nonzero-valued quantized decomposed samples;

Characterized in that said coder further comprises:

partitioning means in each higher frequency subband for partitioning in two-dimensions the quantized decomposed samples into blocks of quantized decomposed samples; and scanning means in each higher frequency subband for scanning the quantized decomposed samples within each block with a same scanning pattern that is associated with that subband's classification as a horizontal, a vertical, or a diagonal subband, the scanning pattern that is associated with each type of subband being different than the scanning pattern associated with each of the other types of subbands and chosen to increase the likelihood of runs of consecutive zero-valued quantized decomposed samples and of runs of consecutive nonzero-valued quantized decomposed samples within the subband, the runs within each scanned subband of consecutive zero-valued and of nonzero-valued quantized decomposed samples being coded by the coding means associated with the subband.

6. A signal coder in accordance with claim 5 wherein each block in a horizontal classified higher frequency subband is scanned with a vertically oriented scanning pattern, each block in a vertical classified higher frequency subband is scanned with a horizontally oriented scanning pattern, and each block in a diagonally classified higher frequency subband is scanned with a zig-zag scanning pattern.

* * * * *